United States Patent [19]
Han

[11] Patent Number: 5,920,212
[45] Date of Patent: Jul. 6, 1999

[54] CONTROL-TYPE CONTINUOUS RAMP CONVERTING APPARATUS AND METHOD THEREFORE

[75] Inventor: Il Song Han, Seoul, Rep. of Korea

[73] Assignee: Korea Telecom, Seoul, Rep. of Korea

[21] Appl. No.: 08/941,105

[22] Filed: Sep. 30, 1997

[30] Foreign Application Priority Data

Oct. 2, 1996 [KR] Rep. of Korea ...................... 96-43741

[51] Int. Cl.$^6$ ....................................................... H03K 4/06
[52] U.S. Cl. ............................................................ 327/131
[58] Field of Search ...................................... 327/131, 132, 327/133, 134, 135, 136, 138, 140, 306, 309, 310, 320, 321, 328, 374–377, 401, 407, 408, 427, 434, 437; 395/24, 27

[56] References Cited

U.S. PATENT DOCUMENTS 3,532,998  10/1970  Bowman ................................. 327/133
5,744,878  4/1998  Wachter et al. ......................... 327/374

Primary Examiner—My-Trang Nu Ton
Attorney, Agent, or Firm—Staas & Halsey

[57] ABSTRACT

Control-type continuous ramp converting apparatus and method therefore. The present invention provides real-time processing of neurons in the neural network, easy implementation and reduction of manufacture cost of high density neurons in the neural network. The present invention comprises a first voltage controlling part for receiving a first voltage from an outside, and for non-linearly increasing a charged voltage in accordance with a differential continuous function of an exponential function; a second voltage controlling part for receiving a second voltage from an outside, and for non-linearly reducing a charged voltage in accordance with a differential continuous function of an exponential function; a charging part for charging an input current, and for providing the charged voltage of the charging part with the second voltage controlling part and an outside; and a plurality of switches for coupling outside and the first and the second voltage controlling part to the charging part, for selectively providing a third voltage from outside, an increased voltage and a decreased voltage based on the voltage of the charging part.

5 Claims, 3 Drawing Sheets

CONTROL-TYPE CONTINUOUS RAMP CONVERTING APPARATUS AND METHOD THEREFORE

BACKGROUND OF THE INVENTION

1. Technical Field of the Invention

The present invention relates to control-type continuous ramp converting apparatus and method therefore, for implementation of a neuron in a neural network, more specifically relates to control-type continuous ramp converting apparatus and method therefore using switches and subthreshold conduction characteristics of MOSFET.

2. Description of the Prior Art

A general neuron in a neural network is implemented by using digital computer. In other words, a result of digital operation is used as an output of neuron in the neural network.

Therefore, the conventional neuron needs a lot of operations, such that there is a problem that a processing speed in neural network remarkably reduces when there are a lot of neurons.

SUMMARY OF THE INVENTION

Therefore, an object of the present invention is to provide control-type continuous ramp converting apparatus and method therefore, by using analog circuit for implementing continuous functionization of a neural output function or a ramp function, thereby outputting differential functions.

According to the first embodiment of the present invention, this object is accomplished by providing for a control-type continuous ramp converting apparatus comprising: a first voltage controlling part for receiving a first voltage from an outside, and for non-linearly increasing a charged voltage in accordance with a differential continuous function of an exponential function; a second voltage controlling part for receiving a second voltage from an outside, and for non-linearly reducing a charged voltage in accordance with a differential continuous function of an exponential function; a charging part for charging an input current, and for providing the charged voltage of the charging part with the second voltage controlling means and an outside; and a plurality of switches for coupling outside and the first and the second voltage controlling part to the charging part, for selectively providing a third voltage from outside, an increased voltage and a decreased voltage based on the voltage of the charging part.

According to the second embodiment of the present invention, this object is accomplished by providing a control-type continuous ramp converting method including the steps of: receiving an input current from an outside, and charging the input current on a charging part; receiving a first voltage and a second voltage from an outside; comparing the first voltage, the second voltage and a threshold voltage with the charge voltage of the charging means; compensating the charged voltage of the charging part based on the comparing result; and outputting the compensated voltage of the charging means to an outside.

BRIEF DESCRIPTION OF THE DRAWINGS

Other objects and aspects of the invention will become apparent from the following description of the embodiments with reference to the accompanying drawings in which.

DETAILED DESCRIPTION OF THE PREFERRED EMBODIMENTS

The embodiments of the present invention will be described with reference to the accompanying drawings.

Figure 1A:
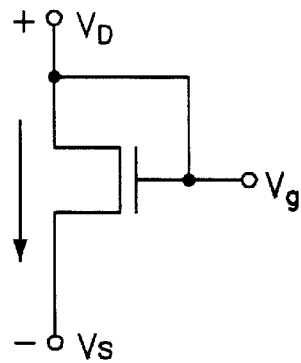
FIGS. 1A through 1C are diagrams illustrating a MOSFET and its subthreshold conduction characteristics.
Figure 1B:
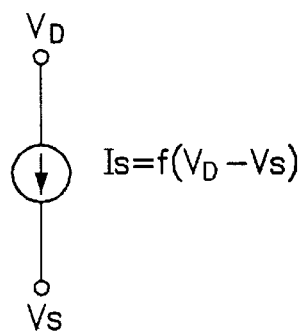
Figure 1C:
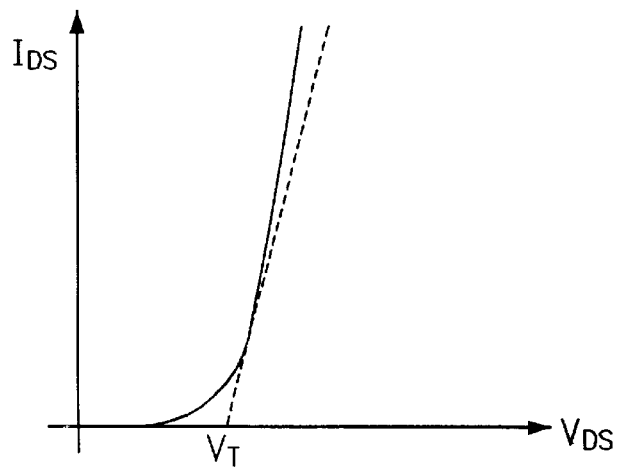

FIG. 1A through 1C are diagrams illustrating a MOSFET and its subthreshold conduction characteristics. FIG. 1A illustrates a MOSFET, and FIG. 1B illustrates a transfer characteristics. In this case, MOSFET in operation range of subthreshold conduction characteristics is modeled as a non-linear current source. FIG. 1C illustrates subthreshold conduction characteristics generated when voltage between gate and source of MOSFET is lower than the threshold voltage. For reference, the present of the invention uses subthreshold conduction characteristics.

Figure 2A:
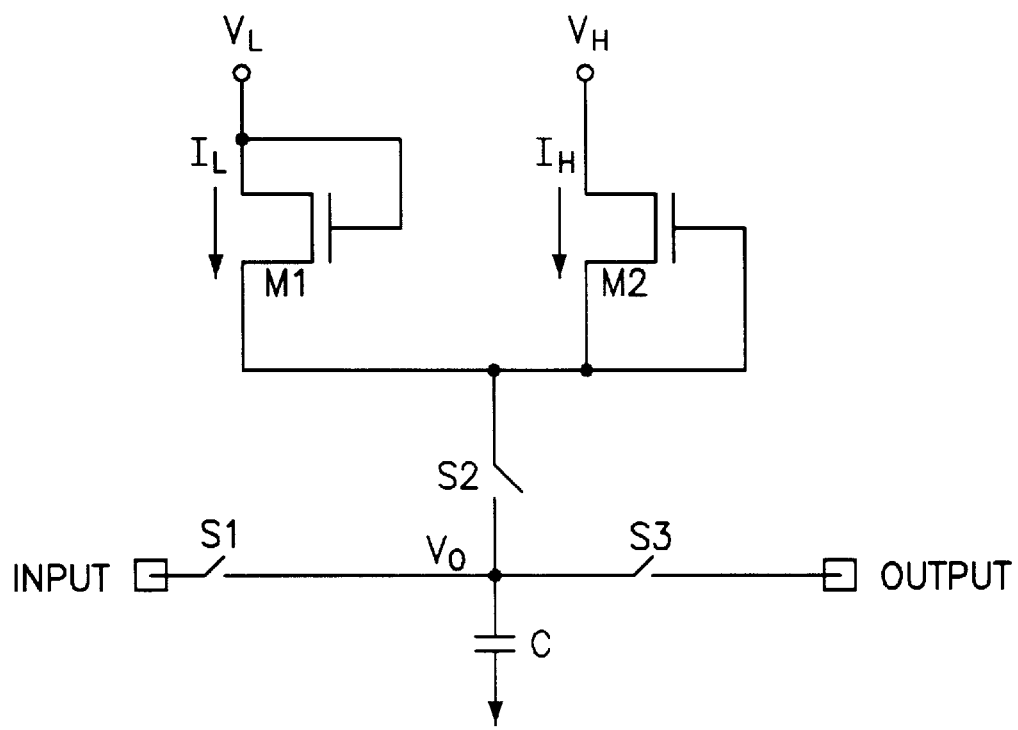
FIGS. 2A and 2B are diagrams illustrating a control-type continuous ramp converter and its transfer characteristics in accordance with the present intention.
Figure 2B:
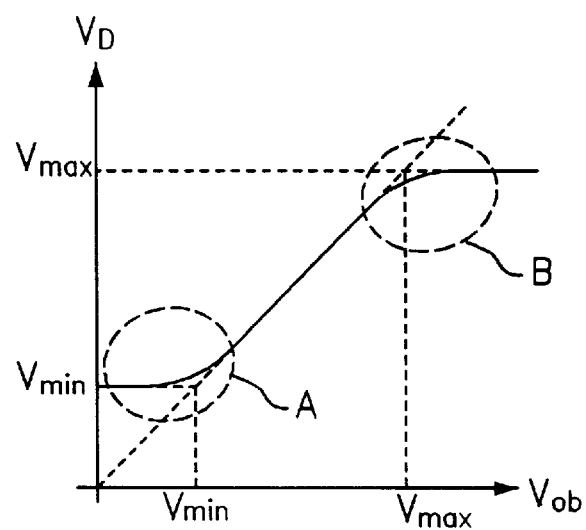

FIG. 2A illustrates a control-type continuous ramp converter and its transfer characteristics in accordance with the present invention. The control-type continuous ramp converter consists of three analog switch S1, S1 and S3 and two MOSFET M1 and M2. The transfer characteristics as illustrated in FIG. 2B may be obtained when the first and the third-switch S1 and S3 turn off and the second switch S2 turns on.

The first MOSFET M1 receives an external voltage through its gate and another end and increases charged voltage in accordance with a differential continuous function of exponential function.

The second MOSFET M2 receives an external voltage through its one end, and non-linearly reduces charged voltage in accordance with a differential continuous function of exponential function.

The first analog switch S1 is coupled between an input terminal and the capacitor. When the first analog switch turns on, the external voltage is inputted and accumulated on the capacitor C.

The second analog switch S2 is coupled among the capacitor C, one end of the first MOSFET M1 and gate and another end of the second MOSFET M2. If the second analog switch S2 turns on, input voltage is accumulated on the capacitor C, or the voltage accumulated on the capacitor is provided to the MOSFET M2 in accordance with the voltage variation.

The third analog switch S3 is coupled between the capacitor C and an output terminal. If the third analog switch S3 turns on, the voltage accumulated on the capacitor C is outputted through the output terminal.

The capacitor, of which one end is coupled to the switches S1, S2 and S3 and the other end is grounded, accumulates the input voltage and outputs voltage of it according to the switching result of the switches.

If the first analog switch S1 which receives signal from the outside and turns on, the voltage $V_O$, which is accumulated in a form of current or charge in accordance with a result of the preceding step, is applied to and accumulated on the capacitor C. At this time, the second and the third switch S2 and S3 turn off, which prevent the other portion of the circuits with being made an effect on.

If the first analog switch S1 turns off, and if the second analog switch S2 turns on, then it is assumed that the current through the first MOSFET M1 and the current through the second MOSFET M2 is respectively limited to the minimum value and the maximum value.

If the first and the second analog switch S1 and S2 turn off, and if the third switch S3 is on, then the voltage $V_O$ accumulated on the capacitor C is outputted. The polar of MOSFET used in the control-type continuous converter is not changed in accordance with the $p^-/n^-$ type.

A detailed operation of the present invention will be described.

If the voltage $V_O$ is lower than the voltage subtracted a threshold voltage $V_T$ from a low voltage $V_L$, since the first MOSFET $M_1$ is satisfied with the threshold voltage value and turns on, the current flows from the voltage source $V_L$ to the capacitor C. The voltage of capacitor C is abruptly increased to an electric potential about $V_L$. Therefore, $V_O$ becomes equal to the low voltage $V_L$.

If the voltage $V_O$ is higher than the result voltage subtracted the threshold voltage $V_T$ from the low voltage $V_L$ and lower than the threshold voltage $V_T$, charges are stored in the capacitor C by a fine current source in accordance with the subthreshold conduction characteristics. The portion of 'A' in FIG. 2B corresponds to this voltage increase.

At this time, the voltage $V_O$ can be expressed as follows:
$V_O = V_{Ob} + I_d/$(capacitance capacity of C).
where, $V_{Ob}$ is the voltage $V_O$ just before the second analog switch S2 turns on, and $I_s$ can be expressed as $f(V_L - V_O)$.

IF the voltage $V_O$ is higher than the low voltage $V_L$ and lower than the high voltage $V_H$, since the first and the second MOSFET M1 and M2 operates as a backward diode, they can not effect on the voltage $V_O$ of the capacitor C.

If the voltage $V_O$ is higher than the high voltage $V_H$ and lower than the result voltage added the high voltage $V_H$ to the threshold voltage $V_T$, although the voltage between gate and source of the second MOSFET M2 is not satisfied with the threshold voltage $V_T$, the second MOSFET M2 operates on the subthreshold range in which a fine current flows. Threfore, charges accumulated on the capacitor C flows to the voltage source $V_H$. At this time, the second MOSFET M2 operates as a current source which is non-linearly proportional to $(V_O - V_H)$, and non-linearly reduces the voltage $V_O$. The portion of 'B' in FIG. 2B corresponds to this voltage variation.

At this time, the voltage $V_O$ can be expressed as follows:
$V_O = V_{Ob} - I_s/$(capacitance capacity of C).
where, $V_{Ob}$ is the voltage $V_O$ just before the second analog switch S2 turns on, and $I_s$ can be expressed as $f(V_O - V_H)$.

If the voltage $V_O$ is higher than the result voltage added the high voltage $V_H$ to the threshold voltage $V_T$, since the voltage between gate and source of the second MOSFET M2 is satisfied with the threshold voltage $V_T$, there is an effect that the voltage source $V_H$ is directly coupled to the capacitor C. In other words, the voltage of the capacitor C abruptly reduces to about the high voltage $V_H$. Therefore, the voltage $V_O$ becomes the high voltage $V_H$.

Then the third analog switch S3 is made to turn off, and the voltage $V_O$ accumulated on the capacitor C is outputted.

Figure 3:
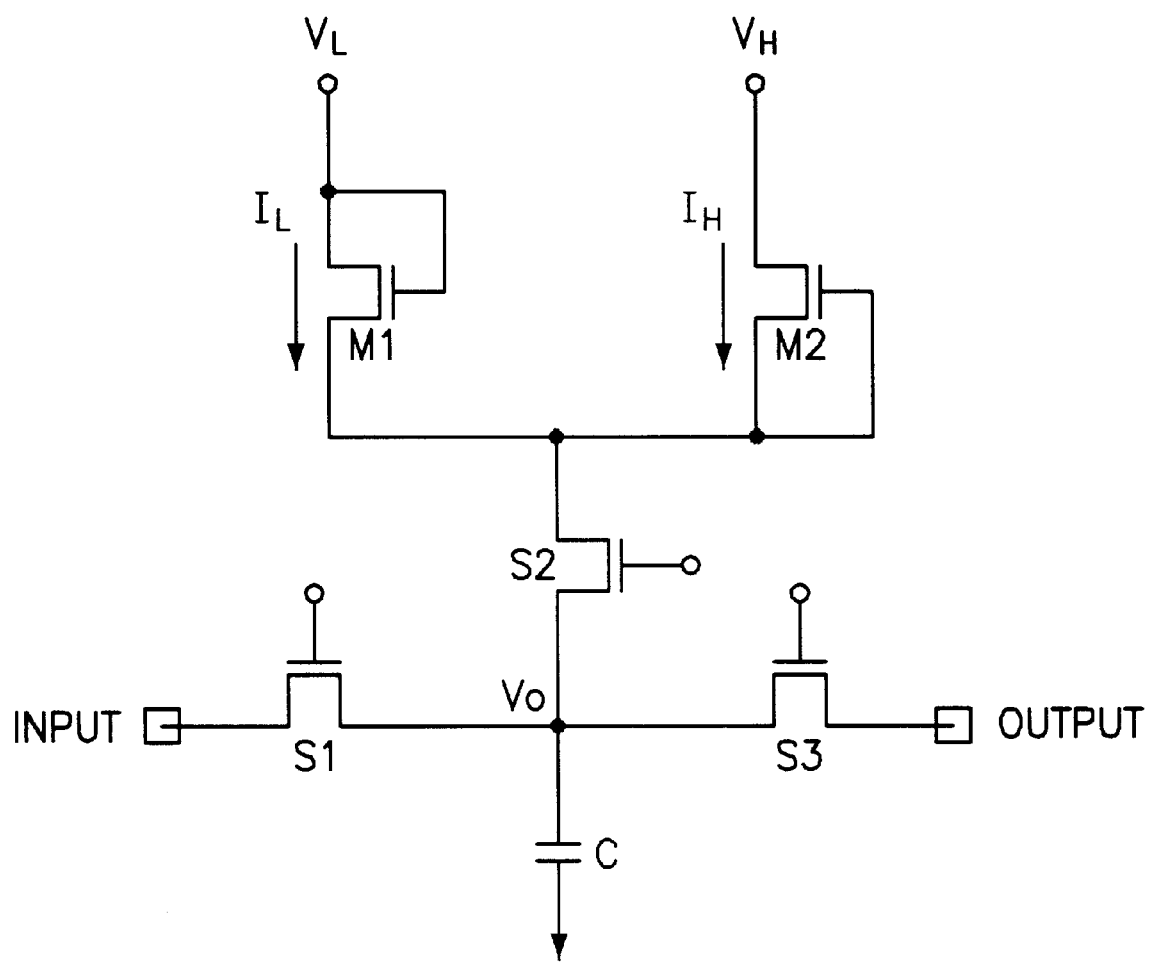
FIG. 3 is a diagram illustrating an application example of a control-type continuous ramp converter in accordance with the present invention.

FIG. 3 illustrates an application example of a control-type continuous ramp converter in accordance with the present invention.

In the example, MOSFETs are used as the switches illustrates in FIG. 2. The configuration and operation of the circuit illustrated in FIG. 3 are the same as the circuit illustrated in FIG. 2.

Using the present invention, the circuit for continuous functionization of a neural network output function or a ramp function can be implemented at an analog way, and differential ability of output function can be implemented, such that they can be obtained perform real-time processing of neurons in the neural network, easy implementation and reduction of manufacture cost of high density neurons in the neural network.

Although the preferred embodiments of the invention have been disclosed for illustrative purposes, those skilled in the art will appreciate that various modifications, additions and substitutions are possible, without departing from the scope and spirit of the invention as disclosed in the accompanying claims

What is claimed is:

1. A control-type continuous ramp converting apparatus, comprising:

a first voltage controlling means for receiving a first predetermined voltage from external said apparatus and a charged voltage, and for non-linearly increasing the charged voltage about the first predetermined voltage in accordance with a differential continuous function of an exponential function;

a second voltage controlling means for receiving a second predetermined voltage from external said apparatus and the charged voltage, and for non-linearly reducing the charged voltage about the second predetermined voltage in accordance with a differential continuous function of the exponential function;

a charging means for charging an input current received from an input terminal in order to provide the charged voltage, wherein the charged voltage is controlled by using the first and second predetermined voltages; and a plurality of switching means including:
a first switching means for coupling the input terminal to said charging means and providing said input current to said charging means;
a second switching means for coupling said first and second voltage controlling means to said charging means to control the charged voltage based on the first and second predetermined voltages; and
a third switching means for coupling said charging means to an output terminal to provide the controlled charred voltage to said output terminal.

2. A control-type continuous ramp converting apparatus as claimed in claim 1, wherein said first, said second and said third switching means respectively comprise a MOSFET.

3. A control-type continuous ramp converting apparatus as claimed in claim 1, wherein said first voltage controlling means receives the first predetermined voltage from external said apparatus through one end and a gate end of said first voltage controlling means and the charged voltage through said second switching means coupled to another end of said first voltage controlling means, and non-linearly increases the charged voltage about the first predetermined voltage in accordance with the differential continuous function of the exponential function.

4. A control-type continuous ramp converting apparatus as claimed in claim 3, wherein said second voltage controlling means receives the second predetermined voltage from external said apparatus through one end of said second voltage controlling means and the charged voltage through said second switching means coupled to a gate of said second voltage controlling means and to another end of said second voltage controlling means, and non-linearly reduces the charged voltage in accordance with the differential continuous function of the exponential function.

5. A control-type continuous ramp converting apparatus as claimed in claim 3, wherein said charging means comprises a capacitor.

* * * * *